United States Patent [19]

Tyrrell et al.

[11] Patent Number: 4,964,095

[45] Date of Patent: Oct. 16, 1990

[54] DATA COMMUNICATION BYPASS APPARATUS AND METHOD

[75] Inventors: Raymond E. Tyrrell; Manal E. Afify, both of Raleigh, N.C.

[73] Assignee: Alcatel NA, Inc., Hickory, N.C.

[21] Appl. No.: 351,389

[22] Filed: May 12, 1989

[51] Int. Cl.$^5$ .............................................. H04J 3/08
[52] U.S. Cl. .................................... 370/55; 370/58.1; 370/16
[58] Field of Search ................ 370/16, 55, 85.1, 58.1

[56] References Cited

U.S. PATENT DOCUMENTS

4,716,561 12/1987 Angell et al. ......................... 370/55
4,779,261 10/1988 Yamagishi et al. ................... 370/16

*Primary Examiner*—Douglas W. Olms
*Assistant Examiner*—Christopher O. Edwards
*Attorney, Agent, or Firm*—Peter C. Van Der Sluys

[57] ABSTRACT

A low speed channel bypass apparatus is described for reprovisioning the time slot multiplexer associated with an add/drop multiplexer so as to insure that particular low speed channel(s) within a high speed channel are passed through the add/drop multiplexer via the time slot multiplexer when the operation of an associated network controller is determined to be faulty. The low speed channel bypass apparatus is particularly directed for use with a high speed channel conforming to the synchronous optical network communication standard (SONET). A watchdog timer is used to monitor the performance of the network controller. The watchdog timer when timed out not only prevents further operation of the network controller, but instructs an associated reprovisioning apparatus to instruct the time slot multiplexer to connect through selected channel(s) from the east high speed interface to the west high speed interface.

16 Claims, 5 Drawing Sheets (NORMAL MODE)

FIG. 3
(NORMAL MODE)

FIG. 4
(FAILED MODE)

B DENOTES AN 8-BIT BYTE

OVERHEAD BYTE LOCATIONS IN AN STS-1 FRAME

DATA COMMUNICATION BYPASS APPARATUS AND METHOD

TECHNICAL FIELD

The present invention relates to bypass apparatus so as to route data communication channels through an add/drop multiplexer (ADM) if the associated ADM controller is not operating properly. The apparatus and methodology is particularly directed to telephony, but is applicable in other situations where bypass routing of information is desirable when a non-redundant component is sensed as not operating properly.

BACKGROUND OF THE INVENTION

The present invention is directed to a device and associated method for bypassing the control of a non-redundant module, such as a network controller, when that module is sensed to be operating improperly. Recently, telephony has begun to use what are known as add/drop multiplexers (ADM's) whose function is to add or remove telephony channels from a high speed multiplexed telephony communication highway. For example, the add/drop multiplexer may be associated with high speed east and west ports (the terms "east" and "west" are commonly used in telephony with respect to describing communication direction) associated with a high speed channel operating at 51.84 megabits per second. This high speed channel may conform to the synchronous optical network (SONET) standard for use in fiber optics interfaces or may conform to such a standard with an electrical interface.

In either event, the add/drop multiplexer further comprises a plurality of lower speed channels such as channels conforming to the DS-1 standard; that is channels (also called links), operating at 1.544 megabits per second. Each DS-1 channel can further comprise up to 24 lower speed channels such as 64 kilobit per second DS-0 channels so that in effect, the high speed channel multiplexes the DS-1 channels which in turn multiplex lower speed DS-0 channels.

The add/drop multiplexer is therefore particularly designed to add or remove DS-1 channels from the high speed channel and to pass these channels along with other through channels via the high speed channel downstream. Such add/drop multiplexers typically incorporate a network element controller which provides performance monitoring, control, alarm reporting, and provisioning of the network element. In particular, the network element controller is responsible for provisioning the time slot multiplexer which in turn provides the ability to crossconnect any synchronous transport signal (STS) virtual tributary (VT) as well as any DS-1 add/drop link. If the network element controller is not of a redundant type, its failure would prevent the proper passage of data communication information between he east and west interfaces of the add/drop multiplexer. It is especially desirable that if the network controller fails, that the SONET section data communication channel information pass through the ADM and thus avoid the network controller.

In particular, the craft orderwire alarm module (COA) of the present invention include circuitry which can detect the status of a watchdog timer which in turn monitors the performance of a network controller. Upon timeout of the watchdog timer, the COA reprovisions the ADM's time slot multiplexer so that the section datacom channel is connected through the east-west high speed interfaces. The watchdog timer also disables the microprocessor associated with the network controller so as to prevent its interference with the TSM.

No prior art device is known which allows use of a non-redundant network controller in association with an add/drop multiplexer so as to allow specified channels within the high speed channel (such as section data communication information) to be passed through the ADM upon perceived failure of the network controller.

SUMMARY OF THE INVENTION

The present invention is directed to a data communication bypass apparatus particularly for use in conjunction with an add/drop multiplexer (ADM). The ADM of the present invention incorporates a non-redundant single network controller (SNC), an associated craft, orderwire alarm module (COA) and a time slot multiplexer (TSM) for use in adding or dropping low speed channels from a high speed channel. The high speed channel associated with the present invention conforms to the SONET communication standard (American National Standard for Telecommunication -ANSI- standard T1.105-1988). This particular standard incorporates section overhead bytes forming part of the synchronous transport signal (STS) including a section data communication channel comprising three bytes; namely, bytes D1, D2, and D3. This section data communication channel is a 192 kilobits per second message channel particularly directed to communicating information concerning alarms, maintenance, control, monitor, administration and other communication needs between section terminating equipment as defined in the SONET standard.

Normally the network controller receives from the high speed interface information concerning the data packets so as to terminate or forward data packets downstream, depending upon perceived conditions. If the network controller (SNC) fails, it is desirable to bypass the SNC and route the data communication channel comprising the D1, D2, and D3 bytes from the east high speed interface via the time slot multiplexer to the west high speed interface.

Typically at any given ADM location, the section data communication channel is routed from the east high speed interface to the network controller. The network controller receives the data packets, terminates the data packets for that site, and forwards the remaining packets via the DS-1 channels to the appropriate add/drop multiplexer.

The present invention incorporates a watchdog timer and a reprovisioning module within the craft orderwire alarm (COA). The watchdog timer monitors the performance of the SNC. If it senses an SNC failure, it informs the COA which then reprovisions the TSM so that the section data communication channel is routed through the TSM to the west high speed interface channel. In other words, the COA reconfigures the TSM so as to bypass the SNC.

OBJECT OF THE INVENTION

It is therefore a principal object of the present invention to provide a channel routing mechanism for passing designated low speed channels through an add/drop multiplexer (ADM) if a non-redundant network controller is perceived to be operating in a failed mode.

Another object of the present invention is to provide a channel routing mechanism incorporating a craft orderwire alarm which monitors a watchdog timer so as to reprovision an associated time slot multiplexer to reroute designated low speed channels to a downstream interface when a non-redundant network controller is perceived to be operating improperly.

Other objects of the present invention will in part be obvious and in part will appear hereinafter.

BRIEF DESCRIPTION OF THE DRAWINGS

For a fuller understanding of the nature and objects of the present invention, reference should be made to the following detailed description taken in connection with the accompanying drawings, in which.

BEST MODE FOR CARRYING OUT THE INVENTION

Figure 1:
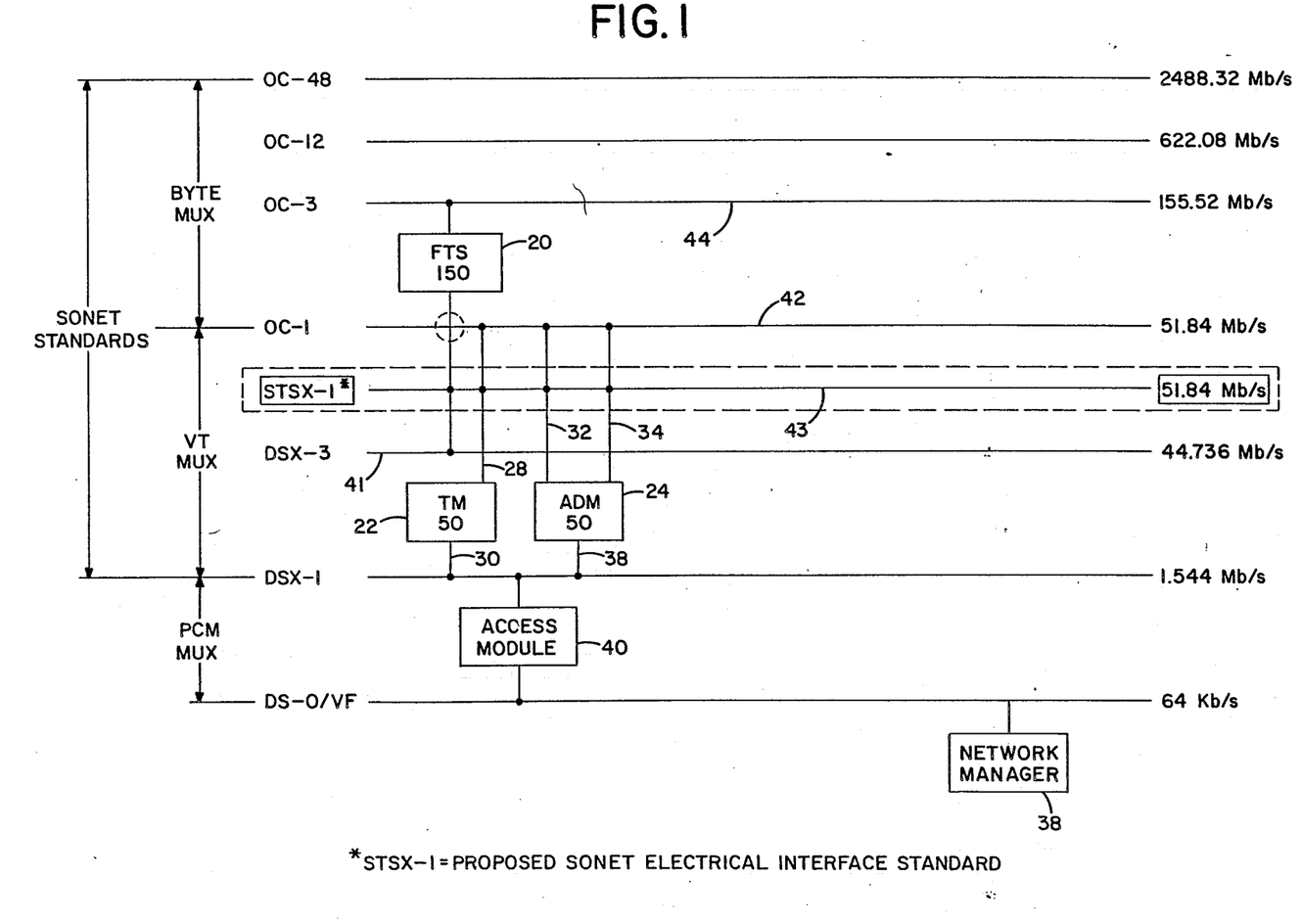
FIG. 1 is an overall block diagram of a synchronous optical transport system showing use of an add/drop multiplexer which can incorporate a data communication bypass mechanism according to the present invention.

FIG. 1 illustrates various devices 20, 22 and 24, that can interface with an optical carrier (fiber optic) transmission medium such as the optical carrier medium 42, 44 operating within the Synchronous Optical Network (SONET) standard adopted by the American National Standards Institute, Inc. (ANSI) as set forth in their standard No. T1.105-1988 entitled "Digital Hierarchy Optical Interface Rates and Formats Specification". This standard is hereby incorporated by reference. According to the SONET standard an optical carrier level (such as OC-1, OC-3, OC-12, OC-48) is the signal that results from an optical conversion of a Synchronous Transport Signal (STS) operating at the same level. The STS-1 (STS level 1) is defined as the basic building block signal with a transfer rate of 51.840 megabits per second (Mbit/s). Thus an STS-N optical carrier level is simply the level 1 rate multiplied by N, where N is an integer equal to or greater than one. The STS bit stream is presented in a frame where the STS-1 frame comprises 810 bytes which can be visualized as nine rows, each 90 bytes wide (see FIG. 5), with the frame period equal to 125 microseconds. The first three columns comprise what is called transport overhead, which in turn comprises section and line overhead. Section overhead deals with the SONET section layer which is directed to the transport of STS-N frames across the physical medium.

Figure 5:
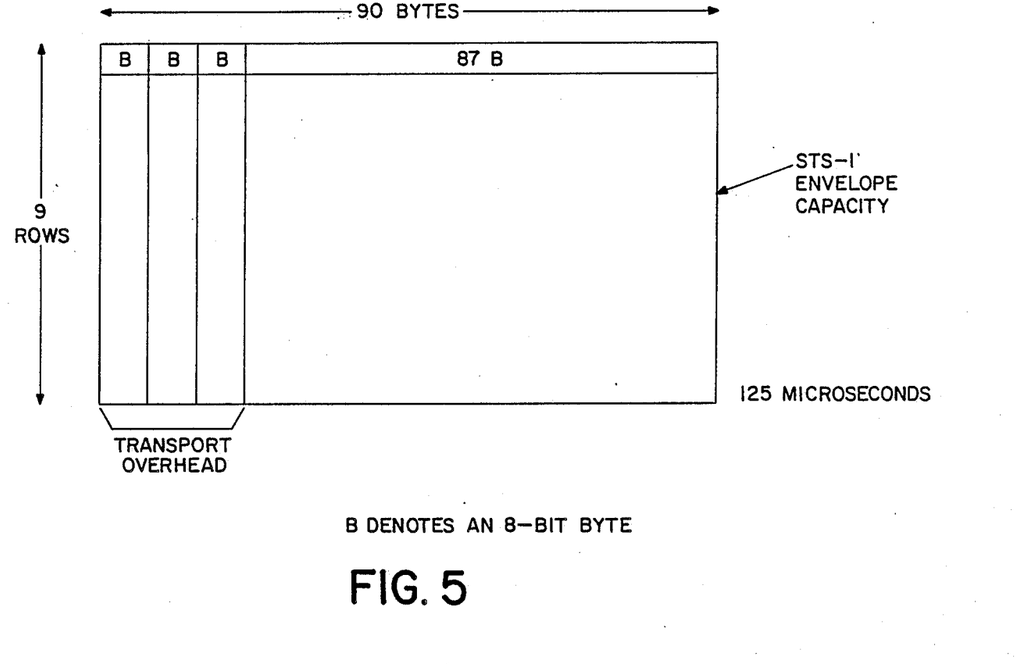
FIG. 5 is a diagram showing the frame format for an asynchronous transport signal frame, specifically an STS-1 frame illustrating both transport overhead and envelope capacity.

The line overhead deals with the line layer which is directed to the transport of Path layer payload. The payload is a synchronous payload whose envelope can reside across two STS-N envelopes.

The synchronous payload envelope (SPE) consists of nine rows, each 87 columns wide. The first column contains path overhead leaving 774 bytes available for payload. It is within this payload that channels of telephonic information are contained, these channels conforming to various digital signal standards such as DS-0 (64 kbits/s), DS-1 (1.544 mbits/s) and DS-3 (44.736 mbits/s).

The fiber transmission system (FTS) 20 is interconnected between an OC-3 carrier 44 operating at 155.52 megabits per second and an electrical DS-3 standard medium 41 operating at 44.736 megabits per second. The fiber transmission system can also connect to a 55.84 megabits per second electrical interface medium 43 identified as STSX-1. This interface is an electrical implementation of the synchronized optical network interface (SONET).

The terminal multiplexer (TM) 22 has a high speed port 28 operating at 51.84 mbits/s that can be equipped with either an electrical interface (STSX-1 electrical path) or a fiber optic interface for operation with the OC-1 SONET Standard. The low speed port 30 of the terminal multiplexer is interfaced with a DSX-1 electrical telephony standard operating at 1.544 megabits per second. Each DS-1 interface can incorporate up to 24 DS-0 channels each operating at 64 kilobits per second. The terminal multiplexer therefor interfaces from 1-28 DSI channels with one OC-1 or one STSX-1 carrier.

The add/drop multiplexer (ADM) 24 is functionally identical to the terminal multiplexer except that the ADM is equipped with east and west high speed interface media 32 and 34, respectively. The low speed port 38 is similar in operation to the low speed port 30 associated with the terminal multiplexer.

Within the section overhead are three bytes, D1, D2 and D3, known as the section data communication channel. These three bytes are allocated to section data communications and are considered by the SONET standard to be one 192 kbit/s message based channel for purposes of conveying alarm, maintenance, control, monitor, administration and other communication needs between section terminating equipment. Section terminating equipment include add/drop multiplexers and terminal multiplexers.

Figure 6:
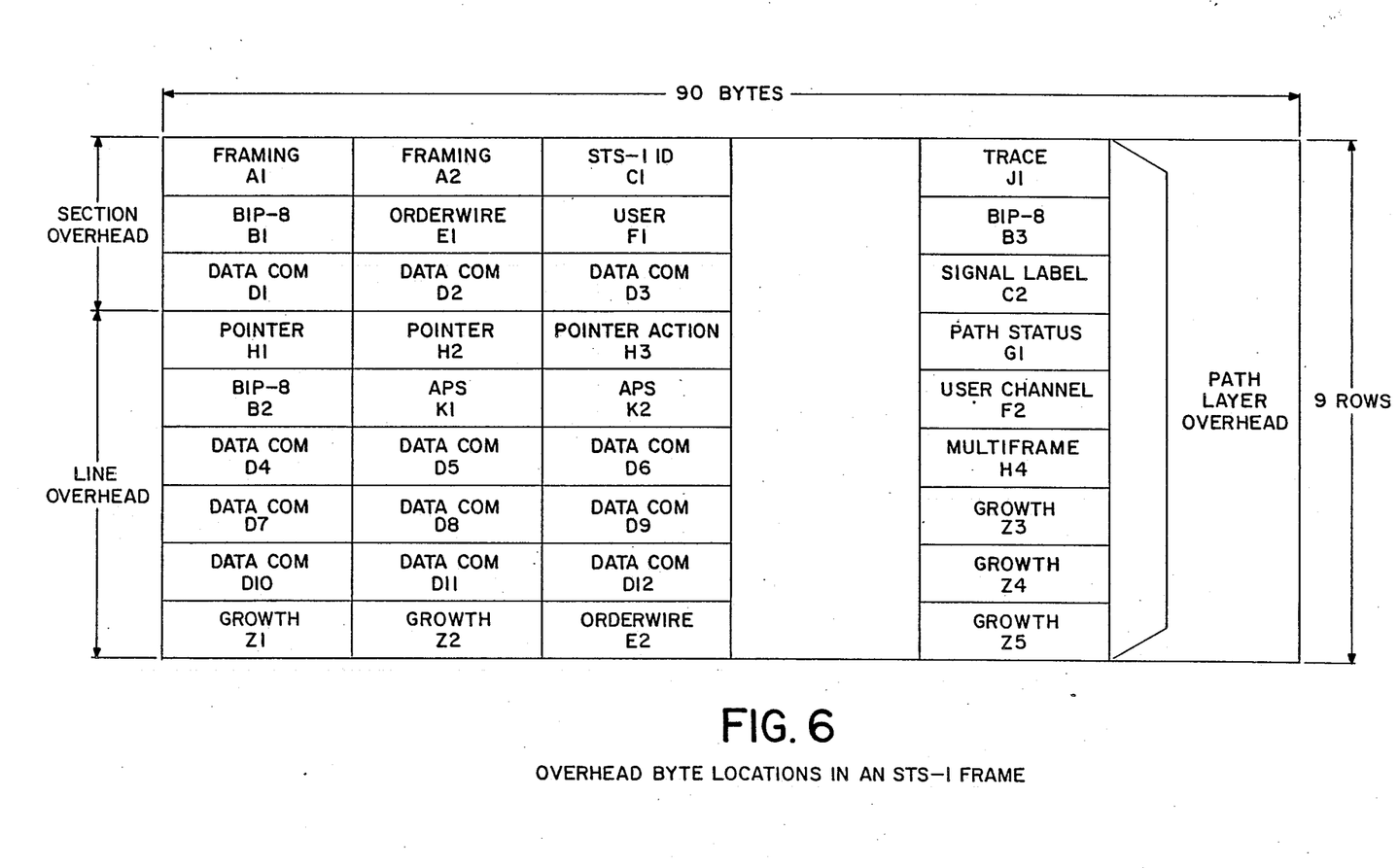
FIG. 6 is a diagram of the overhead byte locations in an STS-1 frame.

Although the preferred embodiment of the present invention is directed to the transfer of section data communication information, it also is applicable to other channels such as the line data communication channel comprising bytes D4 through D12 (see FIG. 6). In fact the present invention could be used to convey any data in the high speed communication channel through the ADM if such bypassing is desired.

Figure 2:
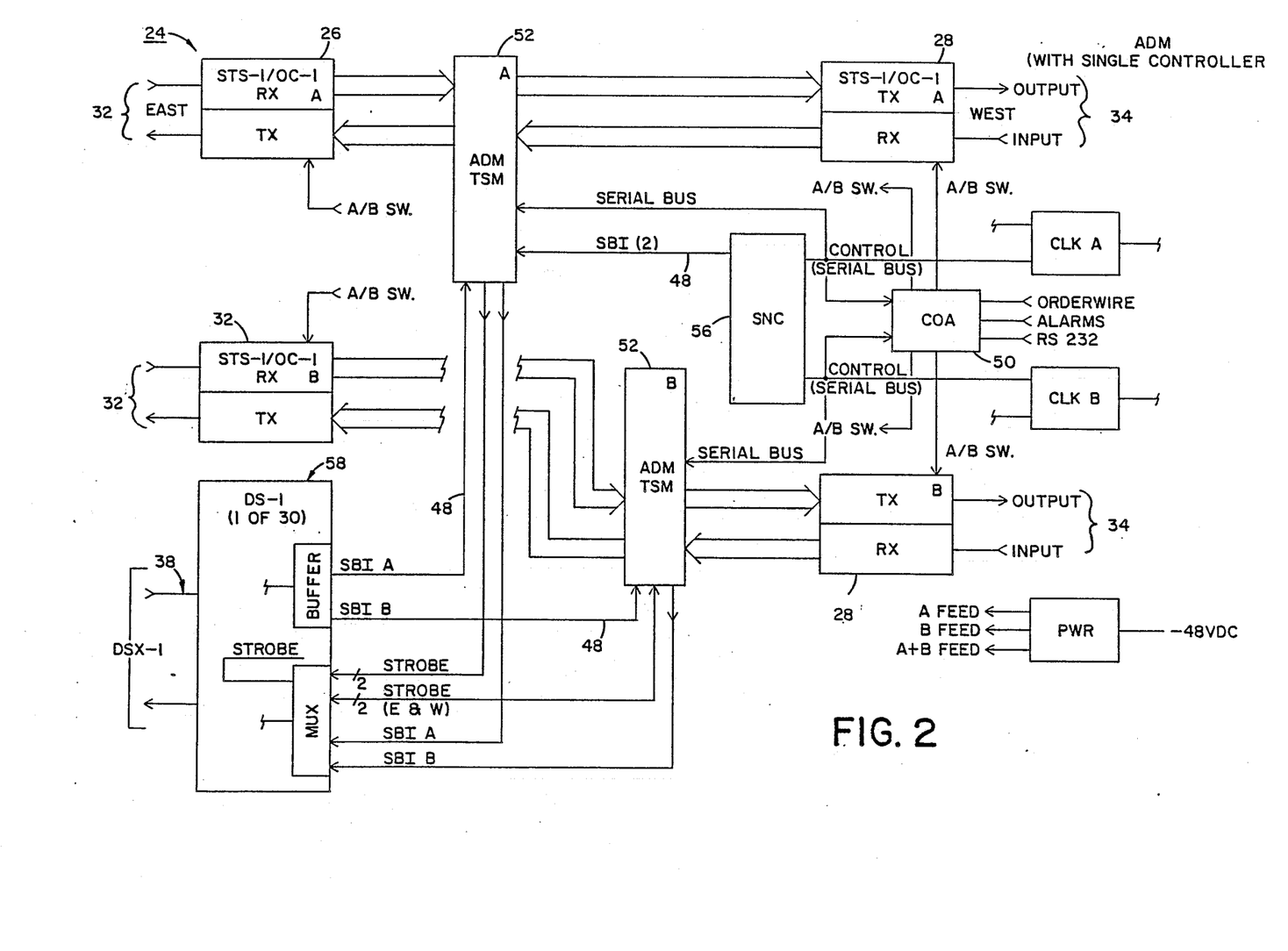
FIG. 2 is a block diagram of an add/drop multiplexer shown in FIG. 1.

More particularly, FIG. 2 illustrates the overall modules comprising ADM 24. The ADM comprises an east high speed interface 26 connected to media 32, a west high speed interface 28 connected to media 34, a time slot multiplexer 52, a craft orderwire alarm (COA) 50, a non-redundant network controller (SNC) 56, a clock 30 and a digital signal-1 (DS-1) interface 58. The east and west high speed interfaces, the TSM, and the DS-1 interface are redundant in that two pathways are provided; namely, path A and path B which are commonly used in telecommunications to increase reliability. The craft orderwire alarm unit 50 is responsible for determining whether path A or path B is to be utilized along with the associated modules, depending upon perceived conditions.

As seen in FIG. 2, the network controller (SNC 56) is not redundant primarily due to the normal high reliability of this controller as well as due to the use of the present invention as described more fully below which achieves the purpose of redundancy; namely to maintain specific datacommunications, even if the network controller becomes faulty.

Figure 3:
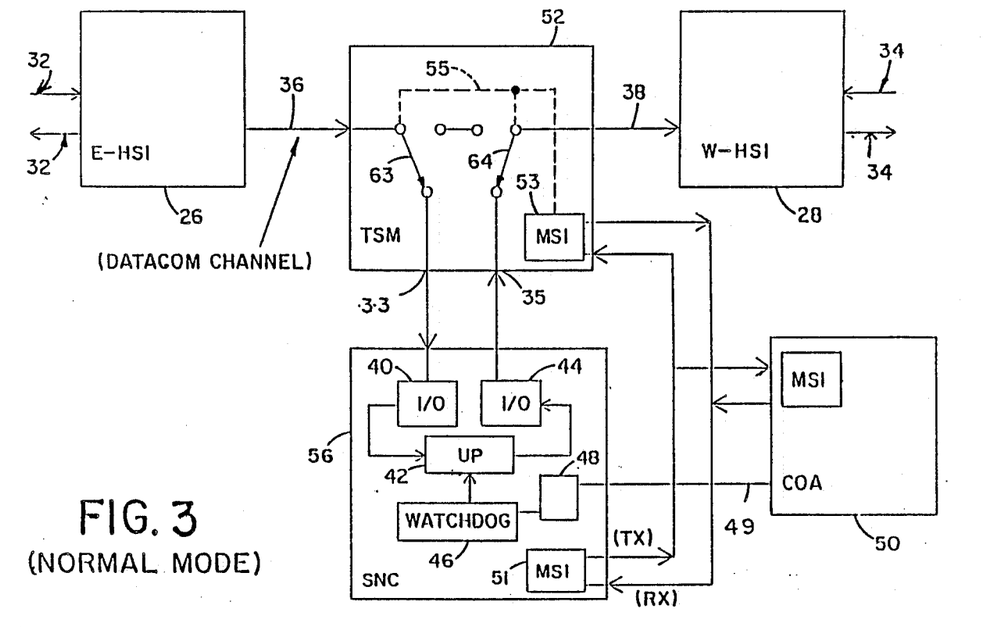
FIG. 3 is a detailed block diagram of the east high speed interface, west high speed interface, time slot multiplexer, non-redundant network controller, and craft orderwire alarm modules shown in FIG. 2 indicating the data path for the data communication channel received from the east high speed interface when the network controller is operating properly.

As seen in FIG. 3, during normal operations the east high speed interface 26 receives the high speed data from the optical carrier medium (see FIG. 1) and directs the information to the time slot multiplexer (TSM) 52.

The purpose of the time slot multiplexer is to provide cross-connections between any virtual tributary within the high speed data channel to any DS-1 add/drop link 32. The virtual tributary is the SONET structure for the transport of sub-STS-1 payload, such as DS-1, DS-1C and DS-2 digital signal channels. The TSM includes a microprocessor 42 which is used to provision the cross-connect function of the TSM by changing data within the connect memory of the TSM. The TSM connect memory in turn controls the east and west interface connections. Further information concerning the connect memory and the associated switch memories is presented in copending application Ser. No. 295,887 filed Jan. 11, 1989, entitled Parallel Time Slot Interchanger Matrix and Switch Block Module, assigned to the present assignee, and hereby incorporated by reference. The network controller 56 is therefore responsible for provisioning the TSM so as to provide interconnections between the input data bus 36 and the output data bus 38. This controller connects to an asynchronous serial bus 61 that operates at a data rate of 128 kbit/s with associated start and stop bits via a multiprocessor serial interface 51. The serial bus protocol is based upon the Intel Corporation (Santa Clara, CA) Micro Controller Mode 2 operation and comprises a start bit, eight data bits, a program bit and a stop bit.

As seen in FIG. 3, the controller is presented with data via a serial bus 34 to an input/output module 40 which in turn is connected to microprocessor 42. The data is then acted upon and presented to a second input/output module 44 and transferred back to the time slot interchanger via serial bus 35.

Within the network controller is a watchdog timer 46 which monitors the performance of the microprocessor to insure that it is operating properly. The status of the watchdog timer is presented to a gate module 48 which is connected via status lines 46 to the COA 50.

When the network controller is operating properly, the microprocessor 42 presents information onto the multiprocessor serial interface 51 which is connected to a second microprocessor serial interface 53 associated with the TSM 52. The data received by the microprocessor serial interface 53 controls the provisioning of the connect memory forming part of the TSM which effectively directs the pathway between incoming data via bus 36 to outgoing data via bus 38. This is shown in phantom by line 55.

Thus during normal operations, the SNC receives the data communication channel information and terminates it if it is appropriate for this particular ADM or forwards the information downstream via the TSM to the west high speed interface.

However if the SNC fails, this failure is detected by the watchdog timer 46. The watchdog timer is an interval timer which is used to detect possible malfunction of the SNC and thus provides a sanity check for the microprocessor and its firmware. In operation, the watchdog timer must be reset by the microprocessor software on a periodic basis to ensure that the processor is executing its associated program code correctly. If the processor does not reset the timer within its time-out period, the watchdog timer will expire. The expiration of the watchdog timer isolates the microprocessor from the system peripherals. Thus upon timeout, the watchdog timer forces the resetting of microprocessor 42 via a signal on output line 47. This action prevents microprocessor 42 from communicating with the multiprocessor serial interface 51; thereby effectively disconnecting communications to the multiprocessor serial interface 53 associated with the TSM 52. This is shown diagrammatically in FIG. 4 via the x's 59 denoting disconnection of the serial control bus with regard to the SNC.

Figure 4:
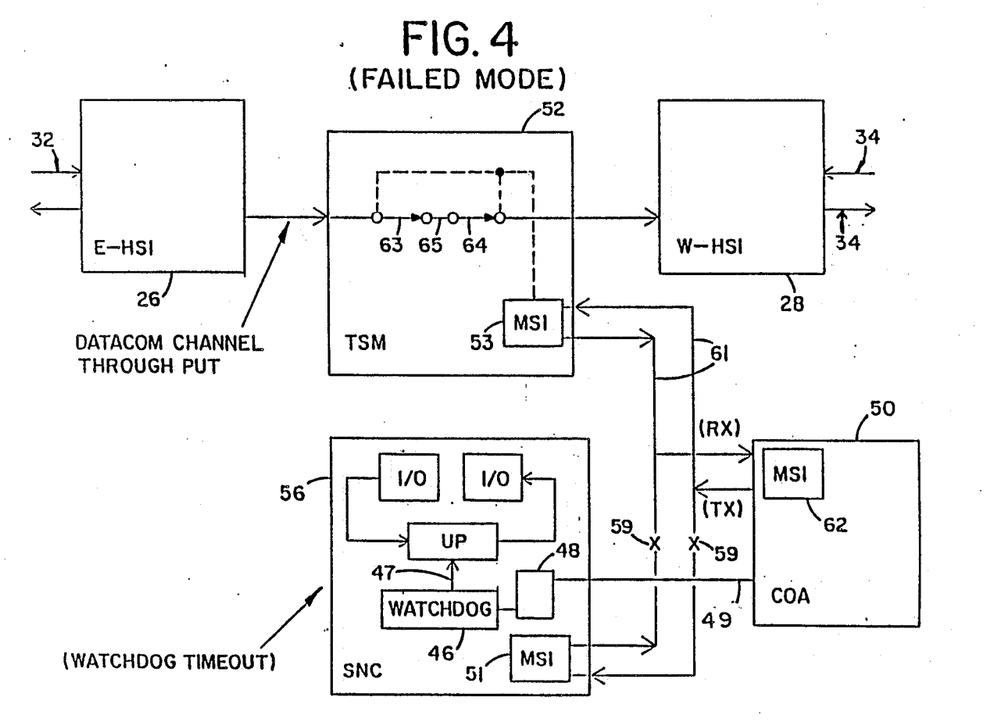
FIG. 4 is a detailed block diagram of the same modules shown in FIG. 3 indicating the communication path for the data communication channel when the non-redundant controller is operating improperly.

The timeout of the watchdog timer 46 also causes status alarm information via bus 49 to be conveyed to the COA. Upon receipt of this information, the COA via its multiprocessor serial interface 62 causes the connect memory of the TSM with regard to the data communication channel to be reprovisioned so as to effectively connect the incoming data channel via bus 36 to the west high speed interface bus 38. This is shown diagrammatically in FIG. 4 by the repositioning of arrows 63 and 64 from the connections to the serial busses 33 and 35 to the through connection 65. FIG. 4 also shows the effective disconnection of the serial busses between the TSM and the SNC.

Although a specific data communication channel within the SONET STS is reprovisioned by the present invention, the same apparatus can be used to reprovision any desired low speed channel within the SONET STS or the other high speed communication channel which is interconnected to an ADM.

DETAILED IMPLEMENTATION

In addition to the detailed description presented above, further implementation information concerning the ADM as well as the TSM, SNC, and COA forming the ADM is presented in an application entitled "Synchronous Optical Transmission System", Ser. No. 351,861, filed May 12, 1989 and assigned to the same assignee. This patent application is hereby incorporated by reference.

In particular, this Synchronous Optical Transmission System patent application presents technical descriptions of each module shown in FIGS. 2, 3 and 4, including the specific modules referenced above. It also presents details with regard to each application specific integrated circuit (ASIC) used in the implementation of the ADM as well as the associated firmware.

Thus what has been described is a data communication bypass apparatus and method for insuring the uninterrupted flow of information from an east high speed interface to a west high speed interface associated with an ADM when a non-redundant network controller is found to be operating improperly.

Although specifically directed with regard to bypassing the network controller with regard to a data communication channel, the present invention is applicable to bypassing any low speed channel comprising part of the high speed channel information transferred from the east high speed interface to the west high speed interface.

It is therefore seen that the objects set forth above and those made apparent from the preceding description, are efficiently attained and, since certain changes may be made in carrying out the above channel bypass apparatus and method without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the channel bypass apparatus and method herein described and all statements of the scope of the invention which, as a matter of language, might be said to fall therebetween.

Having described the invention, what is claimed is:

1. A low speed channel bypass apparatus for use with an add/drop multiplexer, the add/drop multiplexer having an east high speed interface for receipt of a high speed communication channel comprising a plurality of lower speed channels, a west high speed interface for transmitting the high speed channel downstream, a time slot multiplexer interconnected between the east high speed interface and the west high speed interface, the time slot multiplexer having means for removing one or more low speed channels from the high speed channel and for adding one or more low speed channels to the high speed channel as well as means for interconnecting east low speed channels to west low speed channels, a non-redundant network controller interconnected with the time slot multiplexer for directing the adding and removing of low speed channels by the time slot multiplexer with respect to the high speed channel, wherein the bypass apparatus comprises:
   (A) means for monitoring the operation of the network controller, said means generating a status signal for suspending operation of the network controller if said means determines that the network controller is operating in a failed mode; and
   (B) means, sensing the network controller status signal, for reprovisioning the time slot multiplexer upon detection of the network controller monitoring means status signal, so as to connect one or more east low speed channels to west low speed channels;
whereby one or more low speed channels are bypassed through the time slot multiplexer from the east high speed interface to the west high speed interface regardless of their previous interconnections under the prior control of the network controller, thereby providing for continued communications for each selected low speed channel when a non-redundant network controller is operating in a failed mode.

2. A low speed channel bypass apparatus as defined in claim 1, wherein the means for detecting failed mode operation of the network controller comprises a watchdog timer which upon timeout generates an alarm status signal for suspending operation of the network controller, and further wherein the alarm signal is sensed by and activates the reprovisioning means.

3. A low speed channel bypass apparatus as defined in claim 2, wherein the low speed channel reprovisioning means forms part of a craft underwire alarm module and wherein the craft orderwire alarm, the non-redundant controller and the time slot multiplexer are interconnected by a serial bus which, when the network controller is operating properly, provides the communication path from the network controller to the time slot multiplexer for provisioning the interconnects between the low speed channels and wherein the reprovisioning means upon detection of failed mode network controller operation effectively directs use of the serial bus so as to instruct the time slot multiplexer to bypass the non-redundant controller so as to pass selected low speed channels from the east high speed interface to the west high speed interface.

4. A low speed channel bypass apparatus as defined in claim 3, wherein one low speed channel bypassed upon detection of failed mode operation of the network controller, is the section overhead data communication channel forming part of the synchronous optical network transport layer.

5. A low speed channel bypass apparatus as defined in claim 1, wherein the reprovisioning means connects one or more low speed channels to corresponding west low speed channels if the network controller status signal is sensed.

6. A low speed channel bypass apparatus as defined in claim 5, wherein the means for detecting failed mode operation of the network controller comprises a watchdog timer which upon timeout generates an alarm status signal for suspending operation of the network controller, and further wherein the alarm status signal is sensed by and activates the reprovisioning means.

7. A low speed channel bypass apparatus as defined in claim 6, wherein the low speed channel reprovisioning means forms part of a craft orderwire alarm module and wherein the craft orderwire alarm, the non-redundant controller and the time slot multiplexer are interconnected by a serial bus which, when the network controller is operating properly, provides the communication path from the network controller to the time slot multiplexer for provisioning the interconnects between the low speed channels and wherein the reprovisioning means upon detection of failed mode network controller operation effectively directs use of the serial bus so as to instruct the time slot multiplexer to bypass the non-redundant controller so as to pass selected low speed channels from the east high speed interface to the west high speed interface.

8. A low speed channel bypass apparatus as defined in claim 7, wherein one low speed channel bypassed upon detection of failed mode operation of the network controller, is the section overhead data communication channel forming part of the synchronous optical network transport layer.

9. A method of bypassing at least one low speed channel associated with an add/drop multiplexer, the add/drop multiplexer having an east high speed interface for receipt of a high speed communication channel comprising a plurality of lower speed channels, a west high speed interface for transmitting the high speed channel downstream, a time slot multiplexer interconnected between the east high speed interface and the west high speed interface, the time slot multiplexer having means for removing one or more low speed channels from the high speed channel and for adding one or more low speed channels to the high speed channel as well as means for interconnecting east low speed channels to west low speed channels, a non-redundant network controller interconnected with the time slot multiplexer for directing the adding and removing of low speed channels by the time slot multiplexer with respect to the high speed channel, wherein the bypass method comprises the steps of:

(1) monitoring the operation of the network controller so as to generate a status signal for suspending operation of the network controller if the network controller is operating in a failed mode; and (2) sensing the network controller status signals so as to reprovision the time slot multiplexer upon detection of the network controller monitoring status signal, so as to connect one or more east low speed channels to west low speed channels;

whereby one or more low speed channels are bypassed through the time slot multiplexer from the east high speed interface to the west high speed interface regardless of their previous interconnections under the prior control of the network controller, thereby providing for continued communications for each selected low speed channel when a non-redundant network controller is operating in a failed mode.

10. A method of bypassing at least one low speed channel associated with an add/drop multiplexer as defined in claim 9, wherein the monitoring of failed mode operation of the network controller comprises counting toward a timeout so as to generate an alarm status signal for suspending operation of the network controller if the timeout is reached due to failure to reset the counting step if the network controller is operating in a failed mode, and further wherein the alarm status signal is sensed by and activates the reprovisioning step.

11. A method of bypassing at least one low speed channel associated with an add/drop multiplexer as defined in claim 10, wherein the low speed channel reprovisioning step is implemented as part of a craft orderwire alarm module and wherein the craft orderwire alarm, the non-redundant controller and the time slot multiplexer are interconnected by a serial bus which, when the network controller is operating properly, provides the communication path from the network controller to the time slot multiplexer for provisioning the interconnects between the low speed channels and wherein the reprovisioning step upon detection of failed mode network controller operation effectively directs use of the serial bus so as to instruct the time slot multiplexer to bypass the non-redundant controller so as to pass selected low speed channels from the east high speed interface to the west high speed interface.

12. A method of bypassing at least one low speed channel associated with an add/drop multiplexer as defined in claim 11, wherein the low speed channel bypassed upon detection of failed mode operation of the network controller is the section overhead data communication channel forming part of the synchronous optical network transport layer.

13. A method of bypassing at least one low speed channel associated with an add/drop multiplexer as defined in claim 9, wherein the sensing and reprovisioning step connects one or more east low speed channels to corresponding west low speed channels if the network controller status signal is sensed.

14. A method of bypassing at least one low speed channel associated with an add/drop multiplexer as defined in claim 13, wherein the monitoring of failed mode operation of the network controller comprises counting toward a timeout so as to generate an alarm status signal for suspending operation of the network controller if the timeout is reached due to failure to reset the counting step if the network controller is operating in a failed mode, and further wherein the alarm status signal is sensed by and activates the reprovisioning step.

15. A method of bypassing at least one low speed channel associated with an add/drop multiplexer as defined in claim 14, wherein the low speed channel reprovisioning step is implemented as part of a craft orderwire alarm module and wherein the craft orderwire alarm, the non-redundant controller and the time slot multiplexer are interconnected by a serial bus which, when the network controller is operating properly, provides the communication path from the network controller to the time slot multiplexer for provisioning the interconnects between the low speed channels and wherein the reprovisioning step upon detection of failed mode network controller operation effectively directs use of the serial bus so as to intersect the time slot multiplexer to bypass the non-redundant controller so as to pass selected low speed channels from the east high speed interface to the west high speed interface.

16. A method of bypassing at least one low speed channel associated with an add/drop multiplexer as defined in claim 15, wherein one low speed channel bypassed upon detection of failed mode operation of the network controller is the section overhead data communication channel forming part of the synchronous optical network transport layer.

* * * * *

UNITED STATES PATENT AND TRADEMARK OFFICE
CERTIFICATE OF CORRECTION

PATENT NO.    : 4,964,095
DATED         : October 16, 1990
INVENTOR(S) : R. E. Tyrrell et al It is certified that error appears in the above-identified patent and that said Letters Patent is hereby corrected as shown below:

At column 7, line 61, after 'alarm', please insert --status--; and
at line 65, please delete 'underwire' and insert --orderwire--.

At column 10, line 38, please delete 'intersect' and insert --instruct--.

Signed and Sealed this

Thirty-first Day of March, 1992

Attest:

HARRY F. MANBECK, JR.

*Attesting Officer*            *Commissioner of Patents and Trademarks*